No. 831,826. PATENTED SEPT. 25, 1906.
J. BUCCOLA.
DRESS CHART.
APPLICATION FILED APR. 18, 1906.

WITNESSES:
Jas. A. Koehl.
M. A. Schmidt

INVENTOR
Joseph Buccola
BY
Milo B. Stevens & Co.
Attorneys

UNITED STATES PATENT OFFICE.

JOSEPH BUCCOLA, OF CHICAGO, ILLINOIS.

DRESS-CHART.

No. 831,826.  Specification of Letters Patent.  Patented Sept. 25, 1906.

Application filed April 18, 1906. Serial No. 312,373.

*To all whom it may concern:*

Be it known that I, JOSEPH BUCCOLA, a citizen of the United States, residing at Chicago, in the county of Cook and State of Illinois, have invented new and useful Improvements in Dress-Charts, of which the following is a specification.

This invention is a chart or drafting device used to lay out or draft the various contours or forms for women's waists or similar garments or patterns therefor.

The principal feature in this invention is that one implement contains all the necessary curves, drafting edges, and scales to lay out the whole pattern or garment and can be readily used to suit the measurements obtained from different persons, and thus in a short time the patterns can be drafted without the use of other charts or devices.

In using this device, a square, or the sides of one, is first laid out, and afterward, briefly speaking, the straight line of the front is first laid out, then the neck, shoulder, or arm-hole, and then the side, and also the darts or other necessary parts.

An especial feature is that the device is a combination drafting implement, as both sides of the same are used, one side having certain measurements or scales or curves which are a complement of the other side, so as to provide all necessary drafting features in one device.

Figure 1:
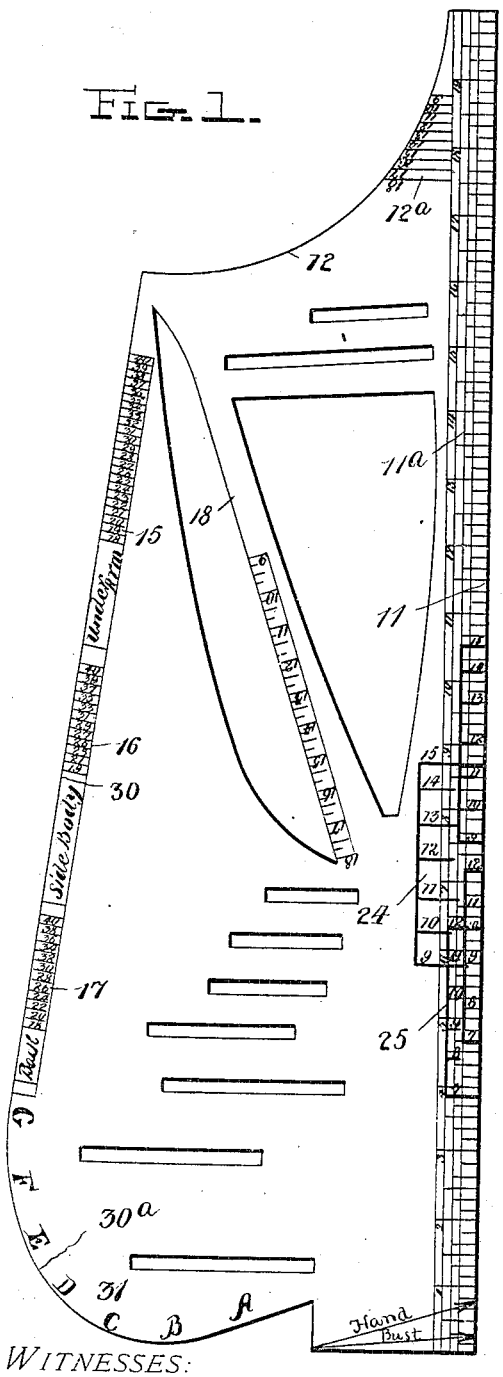
Figure 2:
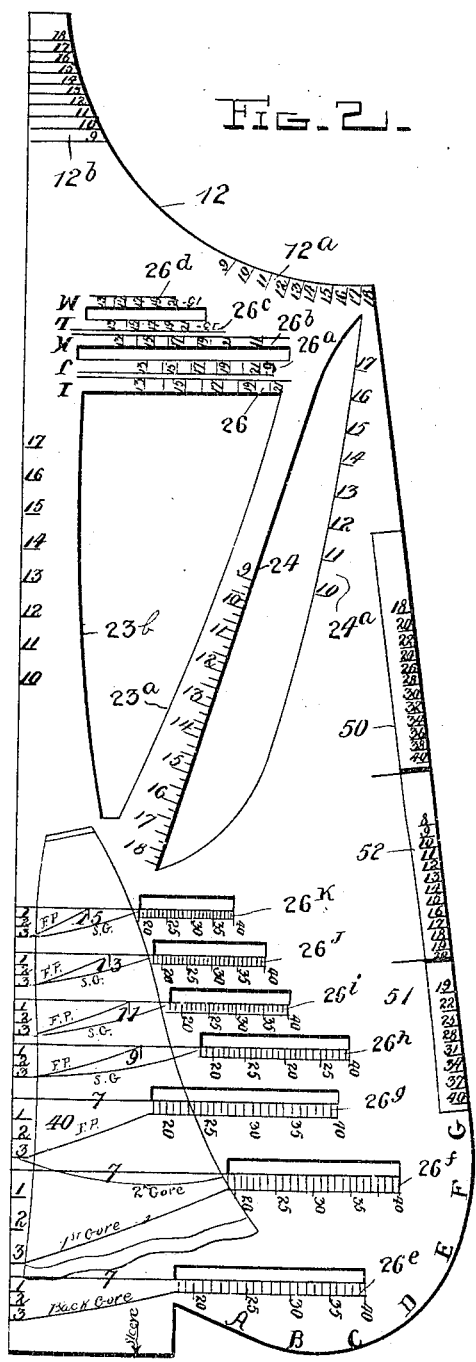

In the accompanying drawings, Figure 1 is a plan of one side of the chart, and Fig. 2 is a plan of the other.

The chart consists, preferably, of a piece of thin steel with the suitable characters impressed thereon or of a suitable plate having the same printed on.

11 represents the front line of the drafting device, which is used to obtain the front or middle line of the waist or other garment. On the drafting edge 11 I provide a scale of inches $11^a$, which is used for drafting a square and general measurements.

12 is a curved drafting edge for laying out the neck-scye, $12^a$ being the scales for the same.

30 is the side drafting edge, the scale for which is shown at 16, which is the scale for the side of the body.

15 is the scale for under-arm scye, and 17 is the scale for center of back.

The edge 30 is a general drafting edge for laying out the curves, and at $30^a$ this is rounded, as shown, and has a scale 31 (shown in letters) for general purposes.

Scales 50 and 51 on edge 30 are used for the front waist size, while scale 52 is used to indicate darts according to difference between bust and waist sizes.

Another feature of the invention is the drafting edge 18, extending along one edge of a long slot in the plate, for laying out the back of the shoulder and on the obverse side at 24 for laying out the front of the shoulders. The opposite edge $24^a$ of the slot is for the under-arm part. Another inset curved drafting recess or opening 23 in the plate is for laying out the hips, $23^a$ being for the front and $23^b$ being for the back. 24 refers to a scale for the length of the arm part below the elbow. 25 refers to the hand-measure. 26 is a scale across the end of the opening 23 and refers to hip-line scale for measurement of a seven-gore skirt on both sides. $26^a$ is a scale for the hip-line of a nine-gore skirt on one side. $26^b$ is a scale for an eleven-gore skirt; $26^c$, for a thirteen-gore skirt, and $26^d$ for a fifteen-gore skirt. These scales are marked along slots made in the plate, as shown, and are used in combination with an indicating-figure in plan 40, and these scales 26 to $26^d$, inclusive, and the plan 40 are used in combination with scales $26^e$, $26^f$, $26^g$, $26^h$, $26^i$, $26^j$, and $26^k$ for the length of the gores. These scales $26^e$ to $26^k$, inclusive, are marked along slots in the plate.

By the use of this device having scales along slots therein all the measurements for both waist and skirt may be obtained and the pattern for both laid out therefrom. The various segmental lines forming the hip portion or skirt are drafted from the curved inset edges $23^a$ $23^b$, the scales 26 and $26^d$ being employed. The curved edge 30 is employed in laying out curved lines in general and especially the sleeve-pattern.

While a pattern is usually first made, the device may be used to lay out the various drafting-lines directly on the cloth, and thus show the cutting-lines on same.

I claim—

A chart having a series of slots therein provided with gore-scales along the edge thereof, and an indicating-figure or skirt plan located beside said slots and adapted for use in combination therewith.

In testimony whereof I have signed my name to this specification in the presence of two subscribing witnesses.

JOSEPH BUCCOLA.

Witnesses:
SIGNA FELTSKOG,
H. G. BATCHELOR.